UNITED STATES PATENT OFFICE.

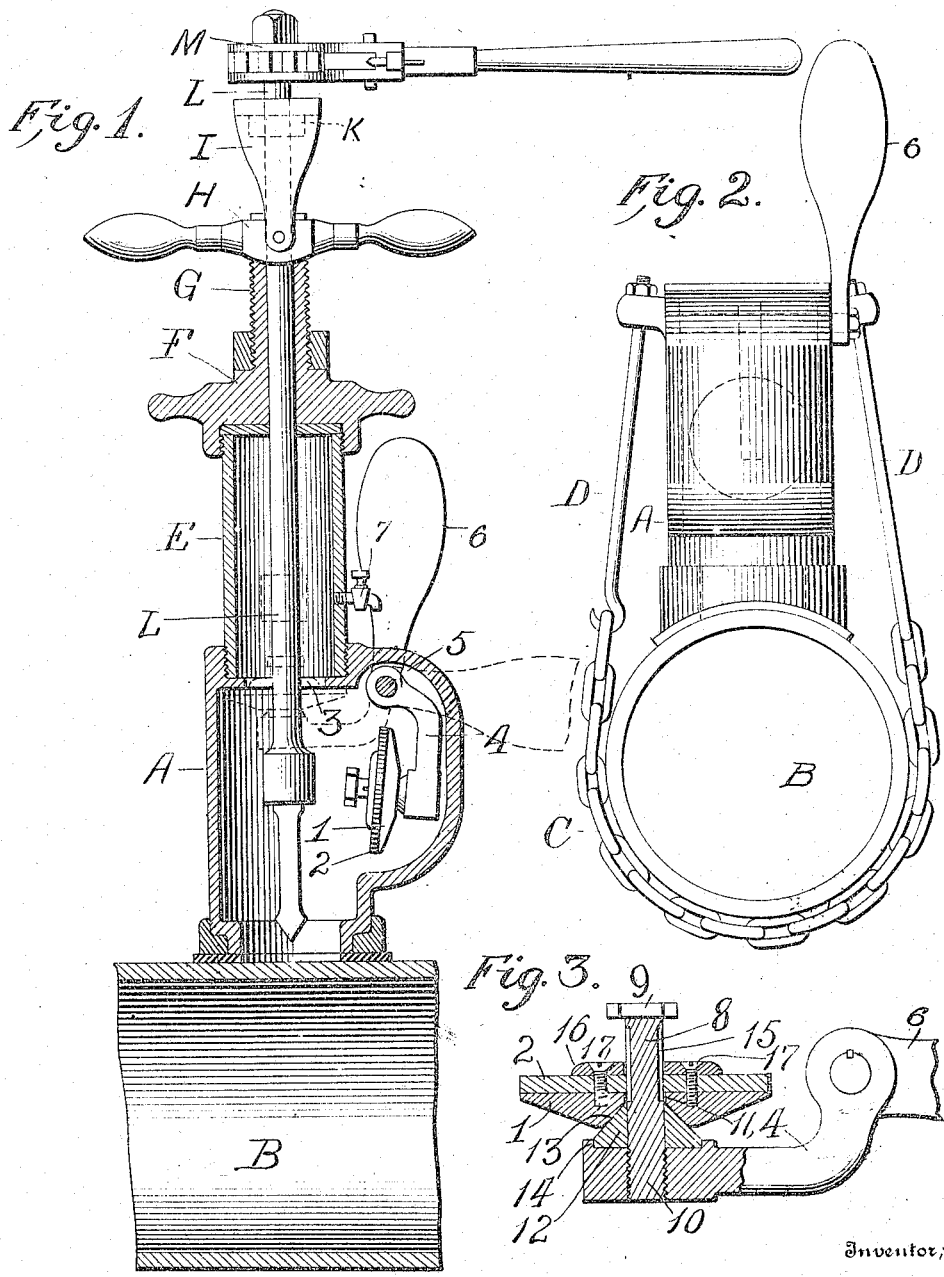

WILLIAM B. FORD, OF DECATUR, ILLINOIS.

PIPE-TAPPING MACHINE.

936,618.　　　Specification of Letters Patent.　　Patented Oct. 12, 1909.

Application filed December 17, 1908. Serial No. 468,013.

*To all whom it may concern:*

Be it known that I, WILLIAM B. FORD, a citizen of the United States, residing at Decatur, in the county of Macon and State of Illinois, have invented certain new and useful Improvements in Pipe-Tapping Machines, of which the following is a specification.

My invention relates to improvements in machines employed for making an opening in a service pipe and introducing a connection thereinto without interrupting the flow or permitting the escape of the contents of the pipe.

Heretofore it has been customary to apply to a pipe to be tapped a casing with interposed packing and to operate a drill within the casing to form a hole in the pipe to be tapped and thereafter to apply a screw plug or so-called corporation cock to control the flow of fluid through the opening. To provide for changing the boring bit, the threading tap, and the controlling cock, the casing has been made in two parts with a gate between them, so that after the opening is made and it is desired to substitute a threading tap in the drill stock, or after the opening is threaded and it is desired to introduce the corporation cock, the gate may be closed between the parts of the casing and will remain closed under the pressure beneath it, while the upper part of the casing is removed to give access to the drill stock. Inasmuch as pressures are often excessive and the gate to close the opening through which the work is carried on is necessarily large, it becomes necessary to equalize the pressure on opposite sides of the gate before the gate can be opened; hence, after the upper part of the casing is replaced and wholly connected with the lower part, it has heretofore been customary to open a small by-pass around the gate. In practice much difficulty has been experienced in establishing flow through this by-pass owing to the presence of metal particles and other debris, and it even becomes necessary in many instances to shut off the flow of the fluid in the public service pipe before the apparatus can be opened up.

It is the object of my invention to obviate the disadvantage above-mentioned, and this I accomplish by providing a by-pass in the gate itself and having this by-pass open by sliding movement of the part that closes the by-pass, so that any obstruction is sure to be removed, and for convenience in use and economy in construction, as well as for the sake of simplicity and durability, I produce this sliding movement by the means which operates the gate, and have it take place as a movement preliminary to the opening of the gate.

More specifically, my invention consists in mounting the gate upon the lever arm and rock shaft, which have heretofore been used, through the medium of a stem attached to the lever arm, but having an axial movement relatively to the gate, so that when the stem is moved upward to press the gate into position, the stem, as well as the gate, will be held in closed position by the pressure of the fluid, but when the lever swings downward, which may readily be done notwithstanding the pressure of the fluid, owing to the small area of the stem, the stem slides in the gate until grooves or other spaces permit the flow of fluid through the gate, after which the gate may be withdrawn by a continued downward movement of the lever.

My invention will be fully understood upon reference to the accompanying drawing, in which, Figure 1 is a vertical sectional view of a tapping apparatus of a known type to which my invention is applied; Fig. 2 is a detail view in a plane transverse to the plane of Fig. 1, illustrating the mode of clamping the machine to the main pipe and also the location of the controlling handle; and Fig. 3 is a sectional detail view of the gate with the sliding stem providing the by-pass, and the controlling parts.

A represents a housing adapted to be clamped to a pipe B through the medium of a chain C and bolts D.

E is an upper section of the housing which is removably mounted upon the housing A and communicates with the latter through an opening which gives access to the pipe B for the drilling and other tools.

F is a closure for the upper section E which carries the threaded stem G to receive the feed nut H that is connected through a yoke I and a shoulder K with the drill stock L, and is adapted to be rotated by the lever ratchet M. As is well known in devices of this construction, the drill stock is rotated and fed downward until a hole is drilled in the pipe B, after which the yoke I is thrown off to permit the drill stock to be raised out of the lower casing A, after which said lower casing is closed off and the upper section E may be removed to replace the drilling bit with a threading tap; the upper section being then replaced and the communication between the sections being opened, so that the drill stock is again fed downward to thread the opening. This is followed by another closing off of the lower casing and removal of the upper casing, and the replacing of the threading tap by a so-called corporation cock that must be introduced within the opening before the machine can be removed.

My invention relates to the means for forming a by-pass from the housing A to the section E while the gate is closed.

1 represents the gate which carries a packing 2 adapted to close the passageway 3 and 4 is the lever which carries the gate mounted upon the shaft 5 which carries at its outer end a controlling handle 6. The handle 6 is thrown downward to bring the gate 1 into close relation with the opening 3, and is of sufficient weight to hold the gate 1 to its seat, so that if the excess of pressure beneath the gate is insufficient to seat it, it will be held in such position until the pressure in the upper chamber is reduced sufficiently to cause seating of the gate under the pressure below it. The cock 7 is then opened to allow escape of the pressure in the upper section 3 and cause the pressure beneath the gate 1 to wholly seat the latter and close off the lower casing A. In order to restore pressure above the gate 1, after section E has been replaced, gate 1 is mounted on the lever 4 through the medium of a stem 8 having a sliding movement in the gate 1, but with a limiting head 9, and threaded into the lever 4 at 10.

11 represents the opening through gate 1, and in order to effectually close this opening by the pressure beneath the stem, the stem is provided with a conical packing 12, while the opening is flared as at 13.

14 represents an annular confining rim on the end of the lever 4 to limit the spreading of the packing 12.

While it is obvious that the stem 8 might fit the gate 1 loosely enough to provide the necessary by-pass as soon as the lever swings down to remove the packing 12 from its seat 13, I prefer to provide the stem 8 with grooves or channels 15, so as to get a more prompt flow of pressure medium when the packing 12 is unseated.

From the foregoing description, it will be seen that the superficial area of the packing 12 is sufficiently small to enable the operator to throw the lever 4 downward by manipulating the handle 6, and as soon as this takes place, pressure will be equalized on opposite sides of the gate 1, or so nearly equalized that by the time the head 9 reaches the gate, the gate will be ready to respond and the complete opening is effected.

The packing 2 may be held in place by any suitable means, such for instance as the annular plate 16 and the screws 17.

With a construction such as above described, it will be obvious that obstructions cannot be lodged in the by-pass, or if they seek to settle therein, the movement of the stem 8 up and down will soon dislodge them.

Having thus described my invention, what I claim as new therein and desire to secure by Letters Patent is:

1. A gate for cutting off communication between the chambers of tapping machines comprising a swinging arm constructed to be fulcrumed upon the machine, a gate valve adapted to close the opening between the chambers of the machine and constructed with a by-pass opening through it and a stem carried by said arm, working through and movable longitudinally in the by-pass opening of the gate valve and a valve surrounding said stem adapted to close the by-pass through which the stem works.

2. In combination with a tapping machine having chambers, a gate valve adapted to close communication between said chambers, provided with a by-pass through which to equalize pressure in the chambers, a swinging arm fulcrumed in the machine, a stem carried by said arm, extending through the by-pass of the gate valve and having longitudinal movement therein, and a valve surrounding the stem adapted to close the by-pass through the gate valve when the stem moves to its limit in one direction.

3. In combination with a tapping machine having chambers, a gate valve adapted to close communication between said chambers, provided with a by-pass through which to equalize pressure in the chambers, a swinging arm fulcrumed in the machine, a stem carried by said arm, extending through the by-pass of the gate valve and having longitudinal movement therein, and a valve surrounding the stem adapted to close the by-pass through the gate valve when the stem moves to its limit in one direction; said valve around the stem being convex and said gate valve having angular movement relatively to the swinging arm whereby the gate valve is adapted to seat independently of the exact position of the swinging arm, and the valve around the stem is adapted to close the by-pass at different angular positions of the gate valve.

4. In combination with a tapping machine having chambers, a gate valve adapted to close communication between said chambers, provided with a by-pass through which to equalize pressure in the chambers, a swinging arm fulcrumed in the machine, a stem carried by said arm, extending through the by-pass of the gate valve and having longitudinal movement therein, and a valve surrounding the stem adapted to close the by-pass through the gate valve when the stem moves to its limit in one direction; said stem also having a head engaging the gate valve in the direction of unseating it by the movement of the swinging arm in the direction in which it moves to open the by-pass.

The foregoing specification signed at New Orleans La, this 11th day of December, 1908.

WILLIAM B. FORD.

In presence of—
Will J. Manion,
H. W. Kaiser.